(12) United States Patent
Ji et al.

(10) Patent No.: US 9,222,214 B2
(45) Date of Patent: Dec. 29, 2015

(54) IRONING BOARD COVER

(75) Inventors: Lanying Ji, Singapore (CN); Yong Jiang, Singapore (SG); Mirjam Christiana Albrecht Van Coillie, Amersfoort (NL); Maarten Theodoor Henric Pelgrim, Utrecht (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/239,575

(22) PCT Filed: Sep. 7, 2012

(86) PCT No.: PCT/IB2012/054641
§ 371 (c)(1),
(2), (4) Date: Feb. 19, 2014

(87) PCT Pub. No.: WO2013/038317
PCT Pub. Date: Mar. 21, 2013

(65) Prior Publication Data
US 2014/0190048 A1    Jul. 10, 2014

Related U.S. Application Data

(60) Provisional application No. 61/533,814, filed on Sep. 13, 2011.

(51) Int. Cl.
*D06F 83/00* (2006.01)
*B32B 3/10* (2006.01)

(52) U.S. Cl.
CPC .. *D06F 83/00* (2013.01); *B32B 3/10* (2013.01)

(58) Field of Classification Search
CPC ............ D06F 81/00; D06F 83/00; B32B 3/10
See application file for complete search history.

(56) References Cited

U.S. PATENT DOCUMENTS

| | | | |
|---|---|---|---|
| 2,481,833 A * | 9/1949 | Foster | 38/140 |
| 4,043,062 A | 8/1977 | Lehrman | |
| 4,097,633 A * | 6/1978 | Focht | 428/138 |
| 4,360,984 A | 11/1982 | Ruttenberg | |
| 5,157,986 A * | 10/1992 | Keller | 74/558.5 |
| 6,349,490 B1 | 2/2002 | Gross et al. | |
| 6,834,450 B2 | 12/2004 | Gross et al. | |
| 2003/0018093 A1* | 1/2003 | Free | 521/50 |
| 2003/0176125 A1* | 9/2003 | Ahluwalia | 442/59 |
| 2006/0213093 A1* | 9/2006 | Krotts et al. | 38/140 |
| 2011/0167684 A1* | 7/2011 | Toutounchian | 38/138 |

FOREIGN PATENT DOCUMENTS

| | | |
|---|---|---|
| CH | 672152 A5 | 10/1989 |
| CN | 201738168 U | 2/2011 |
| DE | 102004008586 A1 | 9/2005 |
| EP | 1002895 A1 | 5/2000 |
| EP | 1321567 A2 | 6/2003 |

(Continued)

*Primary Examiner* — Ismael Izaguirre

(57) ABSTRACT

The present invention relates to an ironing board cover with at least three layers (18, 20, 22) that are arranged on top of each other, wherein one of the layers (18, 20, 22) is a heat resistant cover layer (18) that is permeable to steam (26), another one of the layers (18, 20, 22) is a porous layer (20) that is at least partially permeable to steam (26) and heat, and a further one of the layers (18, 20, 22) is a water proof layer (22) that is impermeable to steam (26) and/or liquid, wherein the porous layer (20) is arranged between the cover layer (18) and the water proof layer (22).

19 Claims, 4 Drawing Sheets

(56) References Cited

FOREIGN PATENT DOCUMENTS

| EP | 1690977 | A2 | 8/2006 |
|---|---|---|---|
| EP | 2166148 | A1 | 3/2010 |
| KR | 1020090042651 | A | 4/2009 |
| WO | 2005106094 | A2 | 11/2005 |
| WO | 2009097978 | A1 | 8/2009 |

* cited by examiner

IRONING BOARD COVER

CROSS-REFERENCE TO PRIOR APPLICATIONS

This application is the U.S. National Phase application under 35 U.S.C. §371 of International Application No. PCT/IB2012/054641, filed on Sep. 7, 2012, which claims the benefit of U.S. Provisional Patent Application No. 61/533,814, filed Sep. 13, 2011. These applications are hereby incorporated by reference herein.

FIELD OF THE INVENTION

The present invention relates to an ironing board cover and to an ironing board including the same.

BACKGROUND OF THE INVENTION

Conventional ironing boards are used in many household appliances for ironing textiles like cloths, curtains, etc. These ironing boards are usually covered with an ironing board cover that serves as a basis or support pad for the textiles to be ironed. The ironing board cover usually builds a flat, planar and smooth support pad on which the textiles can be comfortably placed during the ironing process.

Modern electric irons are often equipped with pressurized steam generators. These steam irons also require a special adaption of the ironing board or the ironing board cover, respectively. Modern steam irons generate a lot of high pressure steam. When used together with conventional ironing boards, steam condensation occurs during ironing due to the cooling of the steam on or near the ironing board. This steam condensation often leads to a wetting of the ironing board cover, and thereby often to an unwanted water build-up. This water build-up is not only disadvantageous since it wets the textiles to be ironed, and thereby complicates the drying of the textiles, but also since this water build-up may lead to a water dripping from the ironing board.

Especially in the case of powerful and pressurized steam generators condensed water may start to drip from the ironing board and form a water build-up on the floor below the ironing board within just several minutes during ironing. This often results in a hassle for the user, since the user needs to clean and dry the floor after ironing. Floors that are sensitive to water may also be damaged. The longer ironing time, which occurs due to the extended time for drying the textiles in case the board cover is wet, additionally decreases the user friendliness.

However, high pressurized steam irons enable a fast removal of wrinkles Thus, ironing boards and ironing board covers need to be adapted to the above-mentioned situations and to the properties of the electric irons. The board covers need to be especially able to manage the amount of produced steam.

The above mentioned effect of steam condensation and water build-up also occurs when regular steam irons are used, which produce high steam amount with less pressure or even no pressure.

Different technical solutions have been developed in the past years to overcome the above-mentioned problems. Many of these problems have been overcome in an efficient way. Nevertheless, ironing boards and ironing boards cover solutions of the state of the art still have drawbacks.

Some ironing boards known from the prior art provide means of collecting steam condensation by creating pockets in the ironing board. During ironing the users thus do not have the problem of water dripping any more. However, water may still flow out from the pockets and wet the floor when the ironing board is folded and stored after the usage. This solution thus only temporarily overcomes the above-mentioned water condensation problem.

Further ironing boards known from the prior art are equipped with an electrical fan or an electrical heater to actively prevent steam condensation. The electrical fan is adapted to blow away the steam, while the electrical heater is adapted to maintain the high temperature of the ironing board, thus to avoid steam condensation. However, this kind of ironing boards usually results in high consumer prices and in a heavy load of the ironing board which makes it difficult to move around.

Further known ironing boards use heat reflective board covers that are coated with a metallic coating. These ironing boards are based on the idea to deflect the heat and steam from the ironing board in order to minimize the steam condensation on the board. However, this has not shown to be effective. Steam still penetrates through the board cover and comes into contact with the ironing board frame, which is in most cases realized as a metal frame. Steam is cooled down on the metal frame, condenses, and drips again on the floor.

An improved ironing board cover is known from EP 1 002 895 A1. The ironing board cover known thereof makes use of a fabric sheet that is impermeable to steam. The pores of the fabric are almost completely sealed by a coating having a closed-cell structure. In this way, a steam barrier is created. As a result, the passage of steam through the ironing board is prevented. Thus, steam is not able to penetrate the board cover any more, wherein the amount of condensation is reduced significantly to almost zero. On the other hand, this results in a steam deflection, wherein most of the generated steam escapes below the steam iron from its lateral sides and then again to the lateral sides of the ironing board. This also changes the guidance and movement properties of the iron, because a cushion of steam and warm air develops under the iron, and the iron slides on this cushion of steam and warm air, which effect is also referred to as air-cushion, hydrofoil or riding-on-air technique.

Even though this technique is realized on purpose according to EP 1 002 895 A1, it has several major drawbacks. First of all, due to the fact that the iron is "flying" over the ironing board, it is hard to create a stretching on the garment. Thus, the ironing results are sacrificed and the ironing time is longer. Secondly, this technique may also result in a danger or health risk for the user. The deflected steam may cause the user to feel hot and uncomfortable. If the user keeps on ironing on one location for a longer time, e.g. when trying to remove tough wrinkles, his/her hand may feel hot, or even burning of the hand may occur.

SUMMARY OF THE INVENTION

It is therefore an object of the present invention to provide an improved ironing board cover that overcomes the above-mentioned problems, i.e. that improves the user friendliness, overcomes the issue of steam condensation on the board cover, and which is able to deliver better ironing results with less ironing time.

The object is achieved according to the present invention by an ironing board cover with at least three layers that are arranged on top of each other, wherein one of the layers is a heat resistant cover layer that is permeable to steam, another one of the layers is a porous layer that is at least partially permeable to steam and heat, and a further one of the layers is a water proof layer that is impermeable to steam and/or liquid, wherein the porous layer is arranged between the cover layer and the water proof layer.

This kind of sandwich structure enables an improved ironing performance. The layers are built in a way that allows steam to be fully utilized for removing wrinkles from the ironed garment, and to manage the amount of steam condensation in the ironing board cover. The presented ironing board cover effectively solves the problem of wetting after long ironing times, even when using powerful steam generators. In addition, the ironing board cover is able to deliver improved ironing results with less ironing time.

The heat resistant cover layer which is used as top layer, during usage, faces upwards, away from the ironing board and towards the iron. In other words, the cover layer is arranged on top, on which the textile to be ironed can be placed. This cover layer is preferably heat resistant in order to withstand high temperatures that occur during ironing.

In contrast to the solution presented in EP 1 002 895 A1, the cover layer is permeable to steam. In this way, the abovementioned, unwanted air-cushion effect is prevented. The cover layer allows a substantially unrestricted steam flow through it. The steam which is generated by the steam iron may thus enter the other layers that are arranged below the cover layer, i.e. the porous layer and the water proof layer. Thus, no steam escapes sidewards below the ironing board and from the side of the ironing board.

The porous layer is preferably made of porous material that allows heat and steam to flow through it. With the combination of the water proof layer, it is able to reflect some amount of steam back to the cover layer. In this way, the reflected steam exits or leaves the ironing board cover again through the cover layer and moisturizes the garment from its bottom side in order to ease the removal of wrinkles "Porous" in the meaning of the present invention denotes an open-cell structure, which is, in contrast to a closed-cell structure, permeable to steam and heat, and thereby allows steam and heat to flow through the interspace between the cells and reflect back freely when intersecting with the cell material. It primarily allows a convective heat transfer. The pore size of the porous material used for this layer is preferably adapted to cause only a little compression set and dimensional change, even after prolonged use.

A water proof layer that is impermeable to steam and/or liquid is preferably arranged on the bottom side of the ironing board cover. The term "liquid" in most of the cases refers to "water", and vice versa. However, also other liquids may be used to generate the steam. The water proof layer is adapted to block the steam to pass through the board cover and to deflect the steam that entered the ironing board cover through the cover layer and through the porous layer back through these layers and thereby back to the garment to be ironed. The water proof layer is preferably also adapted to reflect the entered heat back to the garment. In this way, the energy loss is reduced to a minimum. In an embodiment, the water proof layer may comprise a water absorbing fabric that is adapted to at least partly absorb water. Preferably, the water proof layer is realized as a dual layer which comprises a water proof and a water absorbing fabric. Those two fabrics can also be realized by a single fabric that is water proof and water/liquid absorbing.

Using the above-mentioned layer combination overcomes the problem of water dripping on the floor, since the bottom layer, i.e. the water proof layer, stops the steam and/or liquid water. Furthermore, the air-cushion effect is prevented, since the generated steam is not directly reflected on the top layer of the board cover, or is even hindered completely to enter the inside of the board cover (as this has been presented in EP 1 002 895 A1), but is allowed to enter the board cover and being reflected inside the board cover on one of the lower surfaces, i.e. within the porous layer or at the water proof layer.

The presented layer combination thus allows to effectively manage the amount of steam generated by the steam iron, to almost completely prevent a condensation of the steam, and thereby to improve the ironing comfort. Due to the heat and steam reflection, it enables an energy saving ironing and drying effect without the need of an extra external electric heater of the ironing board. This mainly remains on the fact that a kind of self-heating effect occurs due to the steam reflection, and thus heat reflection within the board cover.

According to an embodiment of the present invention, it is preferred that the cover layer comprises a fabric material, preferably cotton, linen or a cotton polyester blend. It is preferred that the cover layer is made of, or consists of this fabric material. The cover layer can have different surface structures, e.g. in case of cotton, plain cotton can be used. However, also cotton twill and other structural forms are possible. Cotton and linen have shown the ability to withstand high ironing temperatures. Cotton polyester blend has a good balance of high heat resistance, durability and low cost price. Furthermore, these materials are preferably combined with a thin layer of polyurethane foam to make the ironing board cover soft and to realize a smooth support pad for the garment to be ironed.

According to a further preferred embodiment of the present invention, the porous layer comprises a porous fabric material and has a layer thickness of not more than 8 mm. "Layer thickness" in the meaning of the present invention means a spatial dimension of the layer, which is perpendicular to the surface area that is defined by said layer. In other words, thickness means the spatial dimension that is perpendicular to the surface area of the board cover, i.e. perpendicular to the bearing or ironing surface of the ironing board. A thickness of 2 to 8 mm of the porous layer has shown the best results. By keeping the porous layer as thin as possible, the energy loss of the steam passing through the porous layer is kept low, so that the chance of steam condensation is reduced to a minimum.

The porous layer preferably comprises a 3D spacer fabric or a similar open-cell structure foam. These materials have shown to enable a good steam and heat transfer through the material and at the same time a good heat and steam reflection on the intersections with the pores.

Especially preferred is the usage of 3D spacer fabric, since a 3D fabric has the additional benefit of being able to absorb moisture. In this way, condensed steam can be effectively absorbed within the inside of the porous layer. Besides that, a 3D spacer fabric reduces a heat build-up, allows a consistent air circulation and provides a good steam transfer. Additional benefits include comfort cushioning and shock-absorbency with excellent recovery properties. Known 3D spacer fabrics are, for example, Spacetec® 3D spacer fabric. These fabrics are three-dimensional fabrics with an open-cell structure consisting of porous interlaced layers.

3D materials can also be built in such a way that the pore size on the top surface is smaller than the pore size in body and is comparable to the size of the conventional polyurethane foam, while the bottom layer of 3D materials can be made of water absorbing materials. The body of the 3D materials remains the same, sandwiched in between the top and bottom layer. In such a way the layer structure can be simplified to an integrated sandwich structure with the cover layer, the porous layer, the water proof and/ or water absorbing layer all combined in one integrated structure. It is to be noted, that such a kind of integrated sandwich structure, which consists of one combined, multi-layer structure, shall also be understood as an ironing board cover with at least three layers in the sense of the present invention.

The porous layer used according to the present invention preferably has a pore size that allows steam to flow through and reflect back freely, without causing too much compression set and dimensional change after prolong use. Preferably, the material used for the porous layer has a pore size which is in a range of 10 to 70 pores per inch (ppi), even more preferably in a range of 10 to 50 ppi.

Conventional foam, which is made of polyurethane, normally has a pore size of around 85 ppi. The above-mentioned pore size ranges, that are used according to the present invention, result in a smaller material surface area of the pores of the open-cell structure, and thereby in less material compared to conventional polyurethane. Thus, the energy loss of steam passing through the foam is reduced. This again reduces the occurrence of steam condensation. The larger pore size of the material used for the porous layer (compared to conventional foam) furthermore allows steam to deflect back through the cover layer and to the bottom side of the ironed textile with less constrain. This enables to more effectively utilize the steam generated by the electric iron and thus makes wrinkle removal easier.

In case of the usage of 3D spacer fabric, an area density in a range of 200 to 500 g/m$^2$ has shown to result in improved performance for the ironing process, when assuming a polyester base of the fabric. Even more preferable is an area density of the 3D spacer fabric in a range of 250 to 450 g/m$^2$, most preferably in a range of 250 to 350 g/m$^2$. The above-mentioned area density numbers can be correspondingly calculated for other fabric materials based on their material density, based on the above provided ranges for polyester fabric material.

Another parameter to describe the pore size is by air permeability. According to an embodiment of the present invention, the 3D spacer fabric has an air permeability of around 4500 l/(dm$^2$.min) under the pressure of 2 mbar. Different measuring units are used to describe the air permeability of porous materials. In SI-units, the air permeability is often also expressed in (kg .m)/(m$^2$.Pa.s). If this is resolved, the unit results in simple seconds [s]. In other words, the above-mentioned unit of l/(dm$^2$.min) is the same as 6 milliseconds [ms], so that the desired air permeability according to the present invention may be also expressed as 27 ms, which also refers to under pressure of 2 mbar.

It is according to a further embodiment, preferred that the water proof layer comprises a liquid absorbing fabric, preferably a flannel cotton, a polyester felt, or a blend felt of polyester and rayon, wherein the liquid absorbing fabric is coated with or arranged on an impermeable lamination. The liquid absorbing fabric is in most cases a water absorbing fabric. The impermeable lamination may comprise or may be made of any material, e.g. it may comprise a metal sheet, such as an aluminum foil, or a plastic sheet, such as a polyurethane or polypropylene foil. These metal or plastic foils are impermeable to steam and therefore act as good steam and liquid stoppers. Apart from that, such metal and plastic sheets, which are according to the present invention used as bottom or lower base of the ironing board cover, increase the mechanical stability of the cover.

The liquid absorbing fabric is preferably adapted to absorb up to 100% of its weight of condensed steam. A desired liquid/water absorbing material is flannel cotton. Flannel cotton has a fluffy surface that is able to absorb a higher amount of water compared to other materials. The impermeable lamination of the liquid/water absorbing fabric in this case serves to reflect heat and steam. As this has been mentioned above other suitable materials for the liquid absorbing layer are a polyester felt or a blend felt of polyester and rayon.

The lamination is preferably arranged on the bottom side of the water proof layer in order to seal the ironing board cover to its bottom side. The thickness of the impermeable lamination is preferably chosen, such that the pores of the liquid/water absorbing fabric are effectively sealed. This again prevents a water dripping through the ironing board cover.

The thickness of the lamination coating on the fabric is preferably adapted to be thick enough to seal the waving gaps on the fabric. In other words, the thickness is preferably chosen to be thick enough to block water and steam.

According to a preferred embodiment of the present invention, the impermeable lamination comprises a polypropylene film, a polyurethane film, a plastic or thin metal sheet, and preferably has a thickness in a range of 20 to 200 micrometer. Even more preferable is a thickness of 20 to 60 micrometer. In case the lamination is realized as a metal coating, the layer thickness can be even less than 20 micrometer. The term "thickness" again refers to the same spatial dimension of the layer as mentioned above (dimension perpendicular to the surface area that is parallel to the working/ironing surface). It has shown, that such thin lamination films serve for an effective barrier for steam and/or liquid. The liquid absorbing layer does not necessarily need to be integrated into the water proof layer (the bottom layer of the ironing board cover), but may also be arranged at another position within the cover.

According to an embodiment of the present invention, it is therefore preferred that the ironing board cover comprises a liquid absorbing layer, which is preferably made of flannel cotton, wherein the liquid absorbing layer is either arranged between the cover layer and the porous layer, or between the porous layer and the water proof layer. It is, of course, also possible to use more than one liquid absorbing layer. This even increases the water absorbing capability, which may be necessary in case of occurrence of unwanted steam condensation.

According to a further embodiment of the present invention, the ironing board cover further comprises a foam layer, preferably of polyurethane foam, with a layer thickness of less than 10 mm, preferably less than 7 mm, and most preferably of 2 mm, wherein the foam layer is arranged between the cover layer and the porous layer. This thin polyurethane foam layer has the function to provide a soft and smooth surface for ironing. It increases the user comfort. Said foam layer is preferably arranged between the cover layer and the porous layer, i.e. near the top surface that is used for ironing. However, it is to be understood that said foam layer may also be arranged further below within the board cover, between one of the other above-mentioned layers.

According to a further embodiment of the present invention, any of a group of the cover layer, the porous layer, the water proof layer, the liquid absorbing layer and the foam layer, or any combination thereof comprises an antifungal and/or antibacterial material. The application of antifungal and/or antibacterial material mainly has the function to prevent fungal and/or bacterial growth. Fungi growth may especially occur during the storage of the ironing board, when steam, that has been absorbed or collected within one of the layers, cumulates bacteria and starts to decay. The antifungal/antibacterial material can be applied to or integrated in any of the layers of the ironing board cover, preferably on or within the porous layer, more preferably on or within the liquid absorbing layer. It may also be applied to or integrated in more than one of the layers or even in all layers of the ironing board cover.

According to a further embodiment any of the layers may comprise an anti-flammable material, which may be especially helpful to prevent the possibility of a fire origination when an inflammable antifungal and/or antibacterial material is used.

BRIEF DESCRIPTION OF THE DRAWINGS

These and other aspects of the invention will be apparent from and elucidated with reference to the embodiment(s) described hereinafter. Therein.

DETAILED DESCRIPTION OF THE INVENTION

Figure 1:
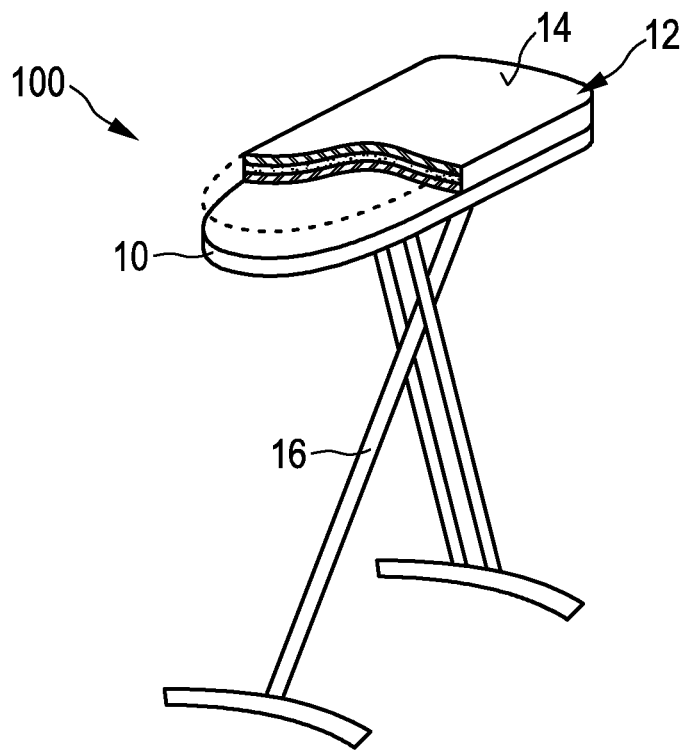
FIG. 1 shows a schematic perspective view of an ironing board with an ironing board cover according to the present invention.

FIG. 1 shows an ironing board that is in its entirety denoted with the reference numeral 100. The ironing board 100 comprises an ironing board top 10 that is at least partially covered with an ironing board cover 12. An upper surface 14 of the ironing board cover 12 serves as support pad for textiles and garment which may be placed on this upper surface 14 of the ironing board cover 12 during ironing. The ironing board 100 may further comprise a stand 16, which is preferably collapsible. However, the stand 16 is not necessarily required for the function of the ironing board 100. The ironing board top 10, which may be realized as a metal board frame, a plastic frame or a wooden frame (of course also other types of frame materials are possible), may also have other types of standing means, and may also be placed directly on a surface, e.g. on a table.

Figure 2:
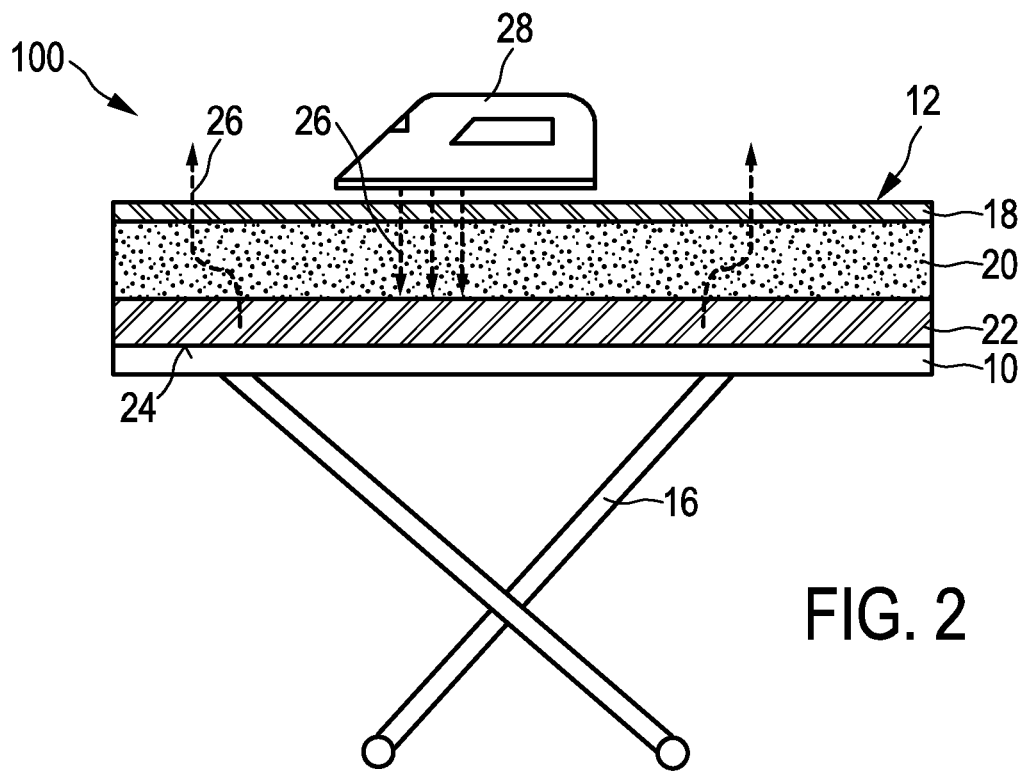
FIG. 2 shows a schematic cross-sectional view of the ironing board and the ironing board cover shown in FIG. 1 to illustrate the technical principle of the present invention, FIG. 3 a shows schematic cross section of a first embodiment of the ironing board cover according to the present invention.

The structural design of the ironing board cover 12 according to the present invention is schematically shown in a cross-sectional view in FIG. 2. This figure schematically illustrates the technical principle of the ironing board cover 12. The ironing board cover 12 according to the present invention comprises at least three layers 18, 20 and 22 that are arranged on top of each other. A heat resistant cover layer 18, which is permeable to steam, is arranged on top of the ironing board cover 12. On a bottom side 24 that, during usage, faces or contacts the ironing board top 10, a water proof layer 22 is arranged. This water proof layer 22 is impermeable to steam and/or liquid. A porous layer 20, which is permeable to steam and heat, is arranged between the heat resistant layer 18 and the water proof layer 22. In other words, the porous layer 20 forms the middle or inner part of the ironing board cover 12.

Figure 6:
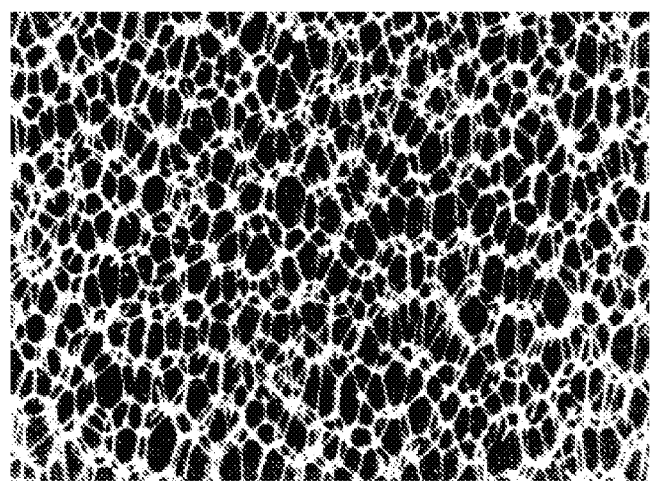
FIG. 6 shows an enlarged view of the material structure of an open-cell foam that may be used as porous layer within the ironing board cover according to the present invention.
Figure 7:
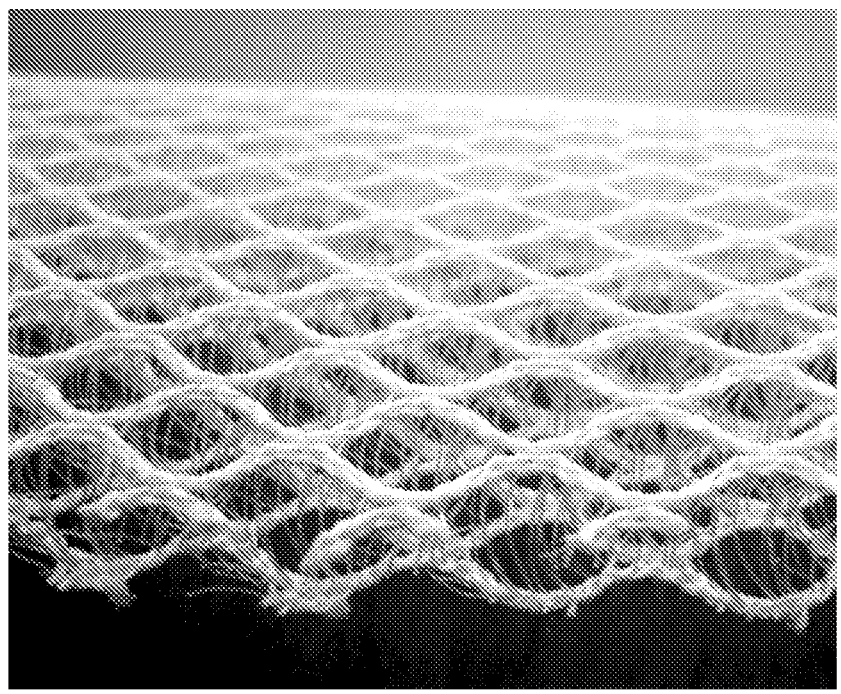
FIG. 7 shows an enlarged view of the material structure of a 3D spacer fabric that may be used as porous layer within the ironing board cover according to the present invention.

The cover layer 18 is made of fabric, preferably cotton or linen, or a cotton polyester blend, that is heat resistant and permeable to steam. The cover layer can have different surface structures, e.g. in case of cotton, plain cotton can be used. However, also cotton twill and other structural forms are possible. The porous layer 20 comprises a porous fabric material, which is preferably realized by 3D spacer fabric or open-cell structure foam. The material structure of an open-cell foam, that is preferably used as material for the porous layer 20, is exemplarily shown in FIG. 6. An exemplary material structure of a 3D spacer fabric, that may also be used as material for the porous layer 20, is shown in an enlarged view in FIG. 7. As can be seen from FIGS. 6 and 7, these materials are porous materials having pores defined in-between the material structure where air may be present. The open cell foam shown in FIG. 6 preferably has a pore size in the range of 10 to 50 ppi. Conventional foam, which is made of polyurethane, normally has a pore size of around 85 ppi. Thus, the surface area of the pores of the open-cell foam (FIG. 6) is less, and less material is required compared to conventional polyurethane. The 3D spacer fabric shown in FIG. 7 preferably has an area density in a range of 200 to 500 g/m$^2$, even more preferably in a range of 250 to 450 g/m$^2$, most preferably in a range of 250 to 350 g/m$^2$. Furthermore, it has a desired air permeability of 4500 l/(dm$^2$.min) under a pressure of 2 mbar.

The size of the pores of the porous layer 20 is adapted to allow steam 26 (indicated by arrows) that is generated by a steam iron 28 to flow through the porous layer 20. A part of the steam 26 is reflected by or within the porous layer 20 and led back to the cover layer 18 where it leaves the ironing board cover 12 again and deflects back to the bottom side of the garment to be ironed. However, most of the steam 26 is led through the porous layer 20 and reaches the water proof layer 22. This water proof layer 22 is impermeable to steam 26 and/or liquid, wherein it prevents a leakage of steam or liquid from the bottom side 24 of the ironing board cover 12. Thus, the water proof layer 22 on the one hand seals the bottom side 24 of the ironing board cover 12, and on the other hand reflects back the heat and the steam which may then be led through the porous layer 20 and the heat resistant cover layer 18 back to the upper surface 14 of the ironing board cover 12. Thereto, the water proof layer 22 can be made of a metallic coating on a fabric, but it may also be realized as a metal sheet or a laminated metal sheet on a fabric, or it may be realized as a plastic sheet, e.g. made of a polyurethane film or a polypropylene film.

In this way, the steam 26 is more or less fully utilized to moisturize the garment from its bottom side again, which eases the removal of wrinkles In contrast to the solution shown in EP 1 002 895 A1, the steam 26 is not directly deflected on the upper surface 14 of the ironing board cover 12. Thus, the above-described air-cushion effect, which is unwanted according to the present invention, is effectively prevented. Water dropping as it occurs according to other prior art solution is prevented as well.

Figure 3:
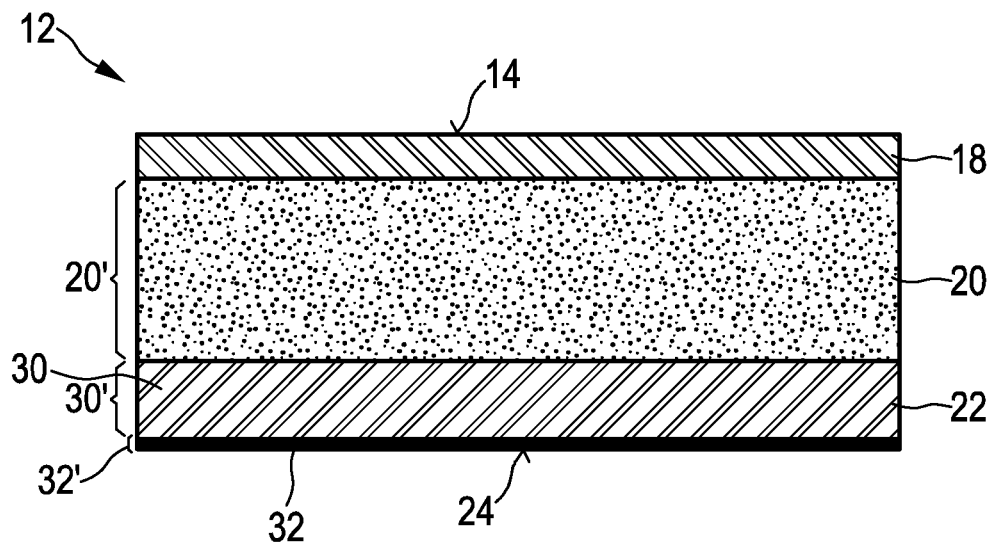

FIG. 3 shows a cross sectional view of an embodiment of the ironing board cover 12 in a schematic way. The layer structure shown therein is similar to that shown in FIG. 2, and comprises a heat resistant cover layer 18, a porous layer 20 and on its bottom side 24 a water proof layer 22. According to this embodiment, the water proof layer 22 comprises a liquid absorbing fabric 30, that is on its bottom side 24 coated with an impermeable lamination 32. The liquid absorbing fabric 30 is preferably made of a flannel cotton, a polyester felt, or a blend felt of polyester and rayon. The impermeable lamination 32 is preferably realized as a polyurethane film, a polypropylene film, or as a plastic or metal film. The liquid absorbing fabric 30 serves as a liquid absorber, which is in case of flannel cotton able to absorb up to 100% of its weight of condensed steam. In this way, an unwanted steam condensation can be absorbed within the lowest layer (within the water proof layer 22).

The impermeable lamination 32 of the water proof layer 22 serves as a liquid and/or steam stopper. To prevent fungal and bacterial growth during storage, the liquid absorbing fabric 30 (the flannel cotton) may furthermore comprise an antifungal and/or antibacterial material. It is to be noted that also the other layers 18, 20 may comprise these antifungal/antibacterial as well, which leads to an even further improved fungal/bacteria growth prevention.

The above-mentioned layers preferably have the following thicknesses. The porous foam layer 20 preferably has a thickness 20' in the range of 2 to 8 mm. A thickness of this size has shown to result in an effective heat transfer and, due to the small thickness, in a minimal reduction of the temperature drop over the layer stack. The liquid absorbing fabric 30 preferably has a thickness 30' of several mm up to 1 cm. The impermeable lamination 32 preferably has a thickness 32' in a range of 20 to 200 μm.

Figure 4:
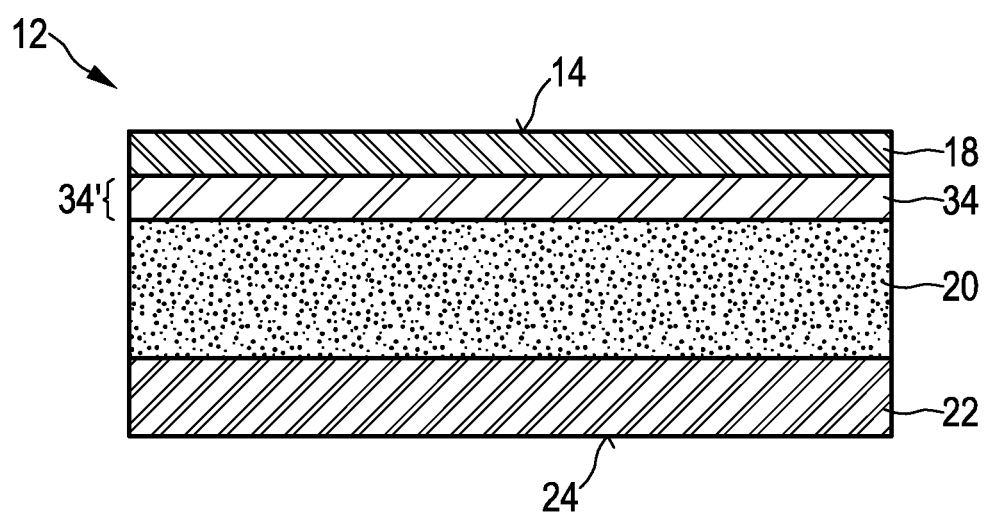
FIG. 4 shows a schematic cross section of a second embodiment of the ironing board cover according to the present invention.

FIG. 4 shows a second embodiment of the ironing board cover 12. According to this embodiment, the ironing board cover 12 further comprises another foam layer 34, which is arranged between the cover layer 18 and the porous layer 20. However, the foam layer 34 may also be arranged between the porous layer 20 and the water proof layer 22 (not shown). This foam layer 34 is preferably made of polyurethane foam and has a layer thickness 34' of less than 10 mm, preferably less than 2 mm, most preferably of around or exactly 2 mm. The additional foam layer 34 mainly has the function of providing a soft and smooth surface for ironing. In order to guarantee the above-mentioned functionality of the ironing board cover 12 the foam layer 34 also needs to be permeable to steam and heat.

Figure 5:
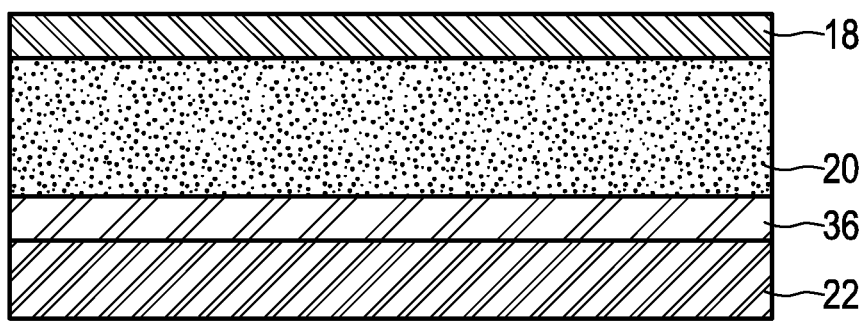
FIG. 5 shows a schematic cross section of a third embodiment of the ironing board cover according to the present invention.

FIG. 5 shows a third embodiment of the ironing board cover 12 according to the present invention. According to this embodiment, the ironing board cover 12 further comprises a liquid absorbing layer 36, which is preferably made of flannel cotton. In the arrangement shown in FIG. 5, the liquid absorbing layer 36 is arranged between the porous layer 20 and the water proof layer 22. However, it has to be noted that the liquid absorbing layer 36 may also be arranged between the cover layer 18 and the porous layer 20. The liquid absorbing layer 36 has the same function as the liquid absorbing fabric 30, which has, according to the embodiment shown in FIG. 3, been integrated into the water proof layer 22. It serves as an absorber for moisture, which may result from steam condensation. In contrast to the embodiment shown in FIG. 3, FIG. 5 illustrates that the liquid or moisture may be absorbed by an extra liquid absorbing layer 36 that forms a separate layer, which is arranged in between the other layers, and not integrated in a layer (the water proof layer 22 as in FIG. 3).

In summary, the ironing board cover 12 comprises at least three layers 18, 20 and 22. However, also a structure with four, five or more layers is possible without leaving the scope of the invention. Even though this is not especially shown, it has to be noted that the above-mentioned foam layer 34 (shown in FIG. 4) and the liquid absorbing layer 36 (shown in FIG. 5) as well as the impermeable lamination 32 (shown in FIG. 3) may also be combined in one ironing board cover 12. An exemplary arrangement would look as follows: The heat resistant cover layer 18 defines the top of the ironing board cover, the foam layer 34 is arranged below, after that follows the porous layer 20, below the porous layer 20 the liquid absorbing layer 36, and below that the water proof layer 22, which is at its bottom side 24 covered with the impermeable lamination 32.

According to the invention, each layer is made of a selected type of fabric that plays a key role of achieving the desired performance. The layers mentioned above are built in a way that allows steam to be fully utilized for removing wrinkles from garments and to manage the amount of steam condensation in the board cover 12. An unwanted air-cushion effect may also be prevented with the presented layer structure. Furthermore, the board cover 12 solves the problem of wetting after long ironing times that might occur due to steam condensation, if powerful steam generators (steam irons) are used. In addition, the ironing board cover 12 is able to deliver improved ironing results with less ironing time.

It has to be noted that the above-described ironing board cover 12 may be used in all types of ironing boards. The above-mentioned layer thicknesses and distinctive materials may also differ from the named ones without leaving the scope of invention.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An ironing board cover comprising a plurality of layers arranged in a multilayer structure, said multilayer structure including:
   an upper cover layer comprising a heat resistant material that is permeable to steam;
   a lower water-proof layer comprising a material that is impermeable to steam and liquid; and
   a porous layer disposed between the cover layer and the water-proof layer, said porous layer comprising a material that is permeable to steam and heat, said material comprising one of:
   an open-cell structure foam having a pore size in a range of 10 to 70 pores per inch; and
   a three dimensional fabric comprising an open-cell structure of porous interlaced layers;
   said multilayer structure, in operation, permitting steam to pass through the cover layer and the porous layer.

2. The ironing board cover according to claim 1 where the cover layer comprises a fabric material consisting essentially of cotton, linen or a cotton-polyester blend.

3. The ironing board cover according to claim 1 where the porous layer has a thickness of less than or equal to 8 mm.

4. The ironing board cover according to claim 1 where the porous layer has a pore size that is adapted to at least partially reflect steam, which enters through the cover layer, back to said cover layer.

5. The ironing board cover according to claim 1 where the porous layer comprises a pore size in a range of 10 to 50 pores per inch.

6. The ironing board cover according to claim 1 where the three-dimensional fabric has an area density in a range of 200 to 500 g/m², more preferably in a range of 250 to 450 g/m², most preferably in a range of 250 to 350 g/m².

7. The ironing board cover according to claim 1 where the three-dimensional fabric has an air permeability of approximately 4500 l/(dm²·min) when under a pressure of 2 mbar.

8. The ironing board cover according to claim 1 where the water-proof layer consists essentially of a metal sheet.

9. An ironing board cover comprising a plurality of layers arranged in a multilayer structure, said multilayer structure including:
   an upper cover comprising a heat resistant material that is permeable to steam;
   a lower waterproof layer comprising a material that is impermeable to steam and liquid, said water-proof layer comprising a combination of a liquid and steam impermeable layer disposed on a liquid absorbing fabric layer, said liquid absorbing fabric layer comprising at least one of a flannel cotton material, a polyester felt material, or a blended felt of polyester and rayon; and
   a porous layer disposed between the cover layer and the waterproof layer, said porous layer comprising a material that is permeable to steam and heat, said material comprising one of:
   an open-cell structure foam having a pore size in a range of 10 to 70 pores per inch; and
   a three dimensional fabric comprising an open-cell structure of porous interlaced layers;
said multilayer structure, in operation, permitting steam to pass through the cover layer and the porous layer.

10. The ironing board cover according to claim 1 where the waterproof layer comprises one of a polyurethane film, a polypropylene film, a plastic sheet or a metal sheet, and has a thickness in a range of 20 to 200 micrometer.

11. An ironing board cover comprising a multilayer structure, said structure including:
    an upper cover layer comprising a heat resistant material that is permeable to steam;
    a lower waterproof layer comprising a material that is impermeable to steam and liquid; and
    a porous layer disposed between that cover layer and the waterproof layer, said porous layer comprising a material that is permeable to steam and heat, said material comprising one of:
    an open-cell structure foam having a pore size in a range of 10 to 70 pores inch; and
    a three dimensional fabric comprising an open-cell structure of porous interlaced layers;
said liquid absorbing layer being disposed either between the cover layer and the porous layer or between the porous layer and the water-proof layer and said multilayer structure, in operation, permitting steam to pass through the cover layer and the porous layer.

12. An ironing board cover comprising a plurality of layers arranged in a multilayer structure, said multilayer structure including:
    an upper cover layer comprising a heat resistant material that is permeable to steam;
    a lower waterproof layer comprising a material that is impermeable to steam and liquid; and
    a porous layer disposed between the cover layer and the waterproof layer, said porous layer comprising a material that is permeable to steam and heat, said material comprising one of:
    an open-cell structure foam having a pore size in a range of 10 to 70 pores per inch; and
    a three dimensional fabric comprising an open-cell structure of porous interlaced layers; and
    a foam layer comprising polyurethane foam and having a thickness of less than 10 mm disposed between that cover layer and the porous layer;
said multilayer structure, in operation, permitting steam to pass through the cover layer and the porous layer.

13. The ironing board cover according to claim 1, where at least one of the cover layer, the porous layer, and the waterproof layer includes at least one of an antifungal and an antibacterial material.

14. An ironing board comprising an ironing board top covered at least partially with an ironing board cover comprising a plurality of layers arrange in a multilayer structure, said multilayer structure including:
    an upper cover layer comprising a heat resistant material that is permeable to steam;
    a lower waterproof layer comprising a material that is impermeable to steam and liquid; and
    a porous layer disposed between the cover layer and the waterproof layer, said porous layer comprising a material that is permeable to steam and heat, said material comprising one of:
    an open-cell structure foam having a pore size in a range 10 to 70 pores per inch; and
    three dimensional fabric comprising an open-cell structure of porous interlaced layer;
said multilayer structure, in operation, permitting steam to pass through the cover layer and the porous layer.

15. The ironing board cover according to claim 1 where the porous layer has a thickness in a range of 2 to 8 mm.

16. The ironing board cover according to claim 1 where the three-dimensional fabric has an area density in a range of 250 to 450 g/m².

17. The ironing board cover according to claim 1 where the three-dimensional fabric has an area density in a range of 250 to 350 g/m².

18. The ironing board cover according to claim 1 where the waterproof layer consists essentially of a plastic sheet.

19. The ironing board cover according to claim 1 where the waterproof layer comprises one of a polyurethane film, a polypropylene film, a plastic sheet or a metal sheet, and has a thickness in a range of 20 to 60 micrometer.

* * * * *